April 21, 1964  K. FRANCK  3,129,895
SHIELDING PRISM
Filed Aug. 22, 1957
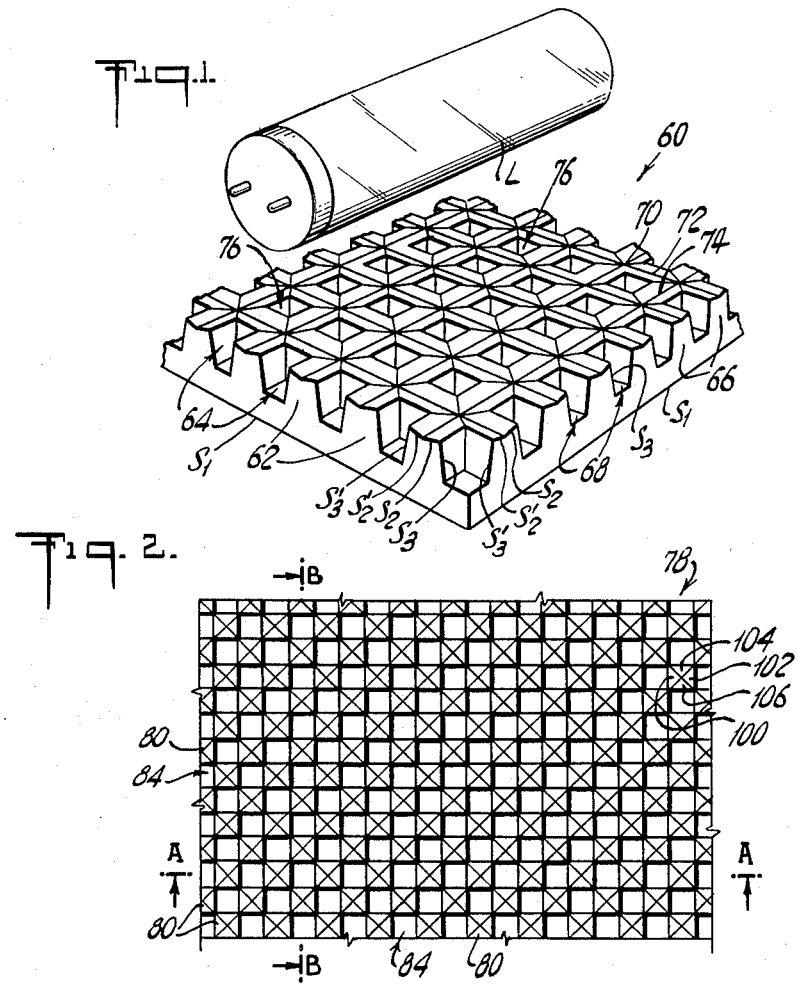
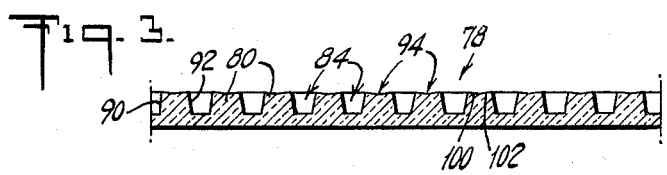
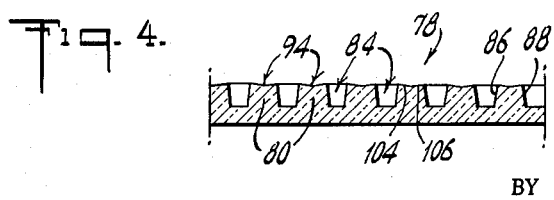
INVENTOR.
KURT FRANCK
BY
Nolte & Nolte
ATTORNEYS United States Patent Office 3,129,895
Patented Apr. 21, 1964

3,129,895
SHIELDING PRISM
Kurt Franck, Newark, Ohio, assignor to Holophane Company, New York, N.Y., a corporation of Delaware
Filed Aug. 22, 1957, Ser. No. 679,609
8 Claims. (Cl. 240—106)

The present invention relates to refracting and transmitting plates and lighting equipment using the same.

It is an object of this invention to provide shielding prisms on the light incident surfaces of the refracting plates to control the direction of emitted light rays in all lateral directions or azimuths.

The accompanying drawings show the present invention, it being understood that the drawings are illustrative of the invention rather than limiting the same.

In the drawings:

FIG. 1 is a perspective view of a refracting plate having rectangularly oriented shielding prisms in the form of ridges, intersecting each other at right angles to form a lattice work of prisms;

FIG. 2 is a top view of a modification wherein individual prisms are raised upwardly from the light incident surface of the refracting plate;

FIG. 3 is a sectional view taken along the line A—A of FIG. 2; and

FIG. 4 is a sectional view taken along the line B—B of FIG. 2.

According to FIG. 1, shielding prisms in the form of ridges are arranged so as to run longitudinally and transversely of the light source, usually a line source, such as a fluorescent lamp L, on the light incident surface of the refracting plate. These prisms provide shielding action in directions transverse as well as longitudinal to the light source. It is not necessary then to provide additional prisms on the light divergent surface of the lens plate, since the hereinabove mentioned shielding prisms on the light incident surface would control the light in all lateral directions or azimuths.

Referring now to FIG. 1, there is shown a refracting plate 60 having on its light incident surface prism configurations, quadrilateral in transverse cross-section above a base plane thereof and including a plurality of first rows of symmetrical quadrilateral ridges 62, separated by spaces 64, intersected at right angles by a plurality of second rows of symmetrical quadrilateral ridges 66 separated by spaces 68. As seen, the ridges 62 and 66 are similar in all respects to each other.

Each ridge has downwardly divergent sloping sides $S_3'$ and $S_3$ and the upper surface is formed into a trough by the downwardly sloping surfaces $S_2'$ and $S_2$.

The angular relationship of the sloping sides with respect to the substantially horizontal outer surface $S_1$, of the light divergent surface of the refracting plate, is fully set forth in co-pending application Serial No. 674,837 and it is intended that the disclosure of the prisms in this co-pending application be incorporated into the instant application.

These rows of ridges desirably are positioned so that one series of rows, i.e. 62, run parallel to a line source of light while the other rows 66 would then run perpendicular to the line light source. However, if desired, these ridges could run in other lateral directions or orientations, for example, diagonally so that each row 62, 66 would run substantially 45° with respect to the line source of light. In either alternative, full shielding action by the ridges would result in all lateral directions.

At the intersection of rows 62, 66 the respective sloping sides $S_2'$ and $S_2$ meet and form a depression having a downwardly concave contour whose lowest point 70 lies in the plane of the ridge lines 72, 74 formed by the juncture of sides $S_2'$ and $S_2$. Open spaces 76 are formed between these intersecting prisms and with rows 62, 66 present a lattice work appearance.

A modification of this invention is illustrated in FIGS. 2 through 4 inclusive, wherein shielding action is secured through shielding prisms 80, raised upwardly from the light incident surface 82 of a refracting plate 78. These upwardly raised prisms appearing shaded in FIG. 2 might commonly be referred to as towers and as seen in FIG. 2, alternate with open spaces 84 to form a checkerboard pattern. Referring to FIGS. 3 and 4, it is therefore seen that each horizontal and vertical row is composed of alternating prisms 80 and open spaces 84.

The prismatic towers 80 are arranged so as to join each other at their corners. Each prism 80 has four downwardly divergent sloping sides 86, 88, 90, 92, the slope of each side being determined in the same manner as the slope of the sides $S_3$, $S_3'$ and all the aforementioned sides 86, 88, 90, 92, having the same slope. The upper light incident surface 94 of each tower prism has a downwardly concave pyramidal recess, the triangular surfaces of the recess having the same slope, the slope being determined in the same manner as the slope of the sides $S_2$, $S_2'$ hereinbefore described. These triangular surfaces are identified at 100, 102, 104 and 106.

The modification illustrated in FIGS. 2 through 4 inclusive would be more difficult to obtain in practice unless the mold from which it is to be formed was made up in laminations. The arrangement as disclosed in FIG. 1 can be readily machined in a solid mold by directly cutting the two intersecting prismatic ridges 62, 66.

I have described what I believe to be the best embodiments of my invention. However, I do not wish to be confined to the embodiments shown but what I desire to cover is set forth in the appended claims.

I claim:

1. A transparent light refracting structure adapted for use in a luminaire having a linear light source, said structure including a plurality of prisms, each prism having substantially the form of a truncated square pyramid with four sloping sides and all of said prisms being arranged in a checkerboard pattern in which each prism is interconnected and integral with adjacent prisms at the corners thereof formed by the sloping sides of each said prism, the truncated surface of each prism having a V-shaped recess to render sai dtruncated surface prismatic.

2. A refracting plate for controlling the direction of emitted light from a linear light source, said refracting plate comprising a transparent base, a first series of elongated spaced truncated prismatic transparent shielding prisms extending upwardly of said base, each of said first prisms being secured to said base at an inner end of said prism and having an outer free surface; a second series of spaced elongated truncated prismatic shielding prisms also extending upwardly of said base, each of said second prisms also being secured to said base at an inner end of each of said second prisms and also having an outer free surface, said second series of prisms being arranged substantially at right angles with respect to said first series of prisms; said first and second series of spaced prisms intersecting each other and forming a surface comprising a series of spaced quadrilateral openings extending downwardly from said outer free surfaces of said prisms to form a series of cavities, the sides of each elongated prism sloping toward the vertical center line of each prism in a direction from said base of said refracting plate to the free surface of each prism, said free surface of each elongated prism comprising a pair of equally sloped surfaces which slope inwardly and downwardly toward the vertical center line of each prism and forming a trough in each of the free surfaces of the elongated prisms, said first and second series of elongated prisms extending along said base for facing the linear light source and for disposition relative thereto at angles of about 45°.

3. Means for controlling the direction of emitted light rays for use with a linear light source, said means comprising a transparent substantially rectangular refractor, said refractor having a light incident side for facing the light source, a first plurality of rows of shielding prisms formed on said light incident side for extending toward the light source, said rows of said first plurality of rows of shielding prisms being laterally spaced relative to one another at regular intervals, a second plurality of rows of shielding prisms formed on said light incident side for extending toward the light source, said rows of said second plurality of rows of shielding prisms being laterally spaced relative to one another at regular intervals and intersecting said rows of said first plurality of rows of shielding prisms at right angles thereto, the outer configuration of said prisms in transverse cross-section being quadrilateral above a base plane thereof, and including two opposing sides, extending upwardly from the base plane and two further sides, extending inwardly from the upper edges of said opposing sides, said opposing and further sides being symmetrically disposed on either side of a plane extending perpendicularly to the base plane, said opposing sides of said prisms extending from the base plane sufficiently for shielding the light emitted from the light source in both longitudinal and transverse directions.

4. Means for controlling the direction of emitted light rays for use with a linear light source, said means comprising a transparent refractor, said refractor having a light incident side for facing the light source, a plurality of prisms forming said light incident side, each of said prisms comprising a truncated tower having four sides, each side extending above a base plane of said each prism, said prisms being interconnected adjacent their corners, the sides of said prisms extending from the base plane sufficiently for shielding the light emitted from said light source in both longitudinal and transverse directions.

5. The means for controlling the direction of emitted light rays for use with a linear light source as in claim 3, wherein said opposing sides of each prism extend in downwardly divergent sloping planes relative to one another, and said inwardly extending further sides extend in downwardly converging sloping planes and form a trough recess.

6. Means for controlling the direction of emitted light rays for use with a linear light source as in claim 5, wherein said first plurality of rows of prisms are arranged for extending in parallel relationship with the linear light source.

7. Means for controlling the direction of emitted light rays for use with a linear light source as in claim 5, wherein said first plurality of rows of prisms and said second plurality of rows of prisms are arranged for extending at substantially diagonal angles of 45 degrees relative to the long axis of the linear light source.

8. Means for controlling the direction of emitted light rays for use with a linear light source as in claim 4, wherein said four sides of each truncated tower extend in downwardly divergent sloping planes relative to the linear light source and the light incident truncated surface of each tower is formed as a concave pyramidal recess.

References Cited in the file of this patent

UNITED STATES PATENTS

| | | |
|---|---|---|
| Re. 14,521 | Gage et al. | Sept. 17, 1918 |
| 563,836 | Blondel et al. | July 14, 1896 |
| 1,194,294 | Johanson | Aug. 8, 1916 |
| 1,241,886 | Rowe | Oct. 2, 1917 |
| 1,791,936 | Rolph | Feb. 10, 1931 |
| 1,950,560 | Martinek et al. | Mar. 13, 1934 |
| 2,143,149 | Guth | Jan. 10, 1939 |
| 2,380,691 | Gross | July 31, 1945 |
| 2,506,951 | Doane | May 9, 1950 |
| 2,859,334 | Guth | Nov. 4, 1958 |
| 2,904,673 | Guth | Sept. 15, 1959 |

FOREIGN PATENTS

| | | |
|---|---|---|
| 999,368 | France | Jan. 30, 1952 |